United States Patent

Czech

[11] 4,336,472
[45] Jun. 22, 1982

[54] CENTRIFUGAL SWITCH ACTUATOR FOR A MOTOR

[75] Inventor: James I. Czech, Lincoln Township, Berrien County, Mich.

[73] Assignee: Whirlpool Corporation, Benton Harbor, Mich.

[21] Appl. No.: 109,797

[22] Filed: Jan. 7, 1980

[51] Int. Cl.³ .......................................... H02K 11/00
[52] U.S. Cl. ..................................... 310/68 E; 310/71; 318/793; 200/80 R
[58] Field of Search ...................... 310/68 R, 68 E, 71; 200/80 R; 318/793

[56] References Cited

U.S. PATENT DOCUMENTS

| | | | |
|---|---|---|---|
| 1,568,508 | 1/1926 | Johnson | 200/337 |
| 2,624,814 | 1/1953 | Shewmon | 200/80 |
| 2,703,516 | 3/1955 | Kluge et al. | 95/11.5 |
| 2,747,854 | 5/1956 | Schnepf | 200/80 R |
| 2,768,260 | 10/1956 | Greenhut | 200/80 R |
| 2,873,332 | 2/1959 | Williams | 200/166 |
| 2,991,655 | 7/1961 | Jorgensen et al. | 73/537 |
| 3,293,388 | 12/1966 | Slonneger | 200/80 R X |
| 3,316,371 | 4/1967 | Nelson | 200/80 R |
| 3,381,197 | 4/1968 | Waters et al. | 318/793 |
| 3,691,415 | 9/1972 | Hancock et al. | 310/68 E |
| 3,699,288 | 10/1972 | Swoveland et al. | 200/80 |
| 3,790,730 | 2/1974 | Wyland | 310/68 E X |
| 4,095,073 | 6/1978 | Frank | 200/80 R X |
| 4,112,588 | 9/1978 | Marcade | 34/45 |
| 4,198,583 | 4/1980 | Anderson et al. | 310/71 |
| 4,262,225 | 4/1981 | Hildebrandt et al. | 310/68 E |

*Primary Examiner*—Donovan F. Duggan
*Attorney, Agent, or Firm*—Hill, Van Santen, Steadman, Chiara & Simpson

[57] ABSTRACT

A centrifugal switch actuator compensates for normal axis tolerance in a centrifugal switch operating mechanism for a motor consisting of a rotational velocity-responsive element mounted on the motor shaft and a switch housing spaced from the shaft. A lever has a lower member disposed adjacent the rotational velocity-responsive element and an upper member which engages one of a plurality of grooves in an actuator movable in the switch housing to make and break switches therein.

12 Claims, 6 Drawing Figures

U.S. Patent  Jun. 22, 1982  Sheet 1 of 2  4,336,472
FIG. 1
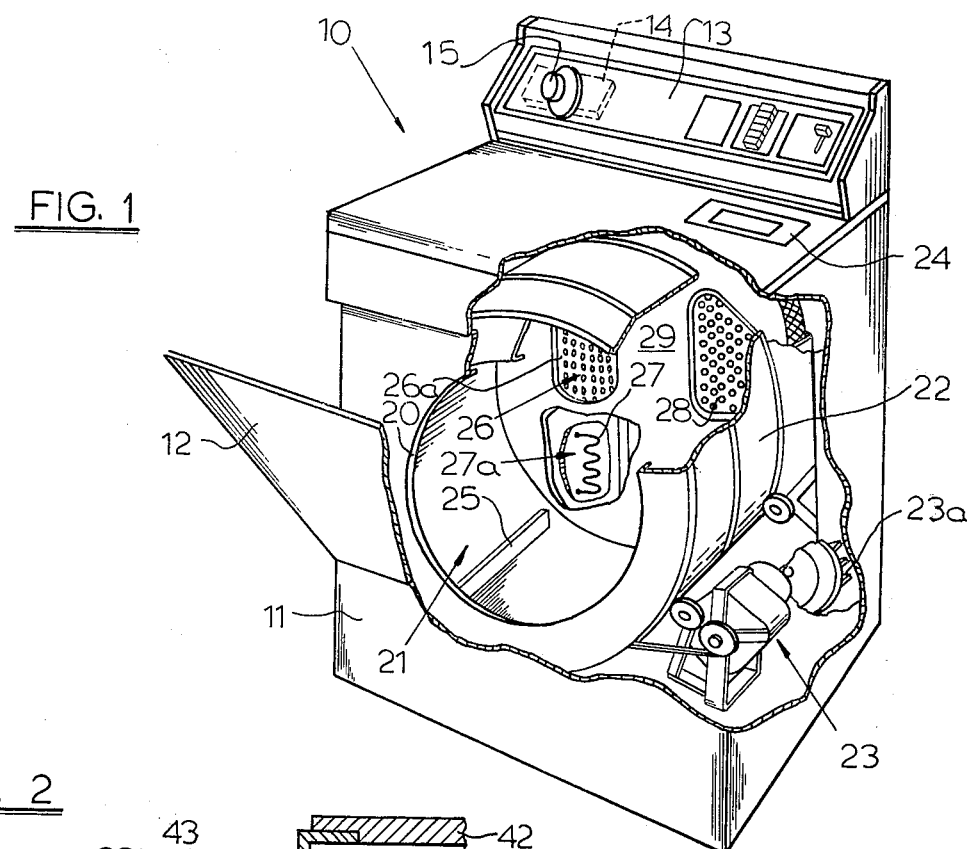
FIG. 2
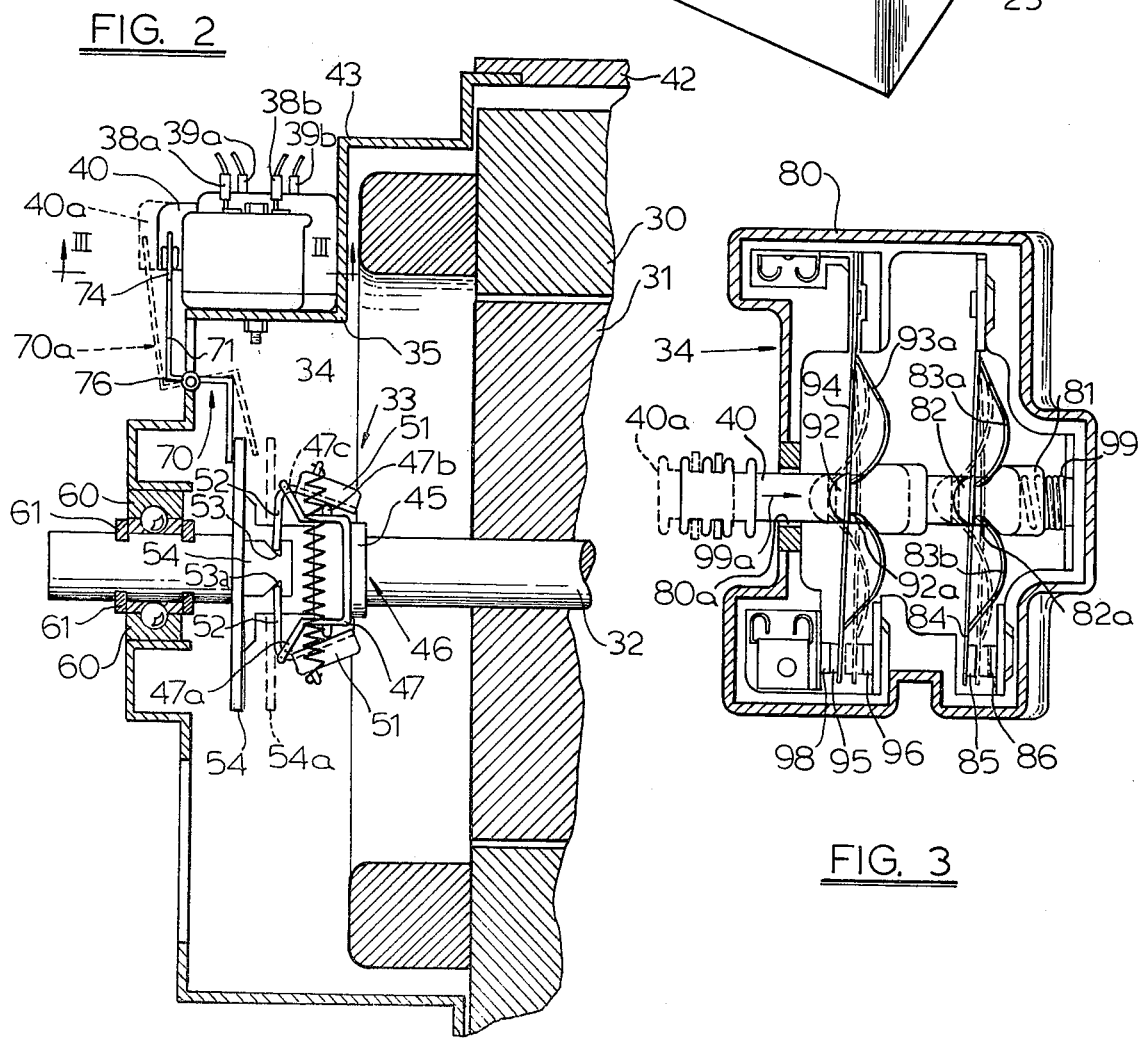
FIG. 3

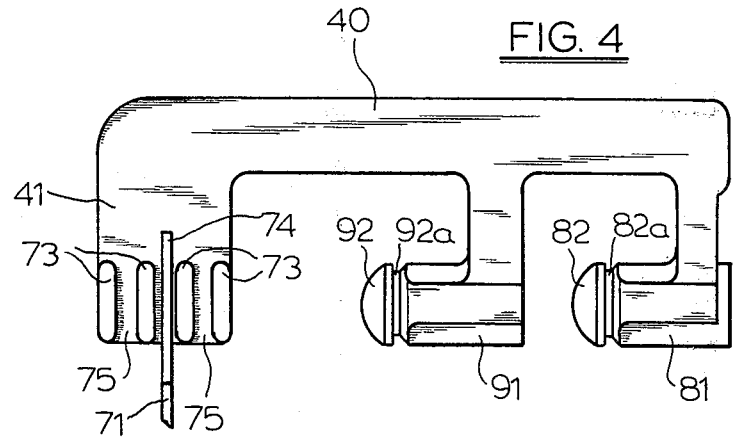
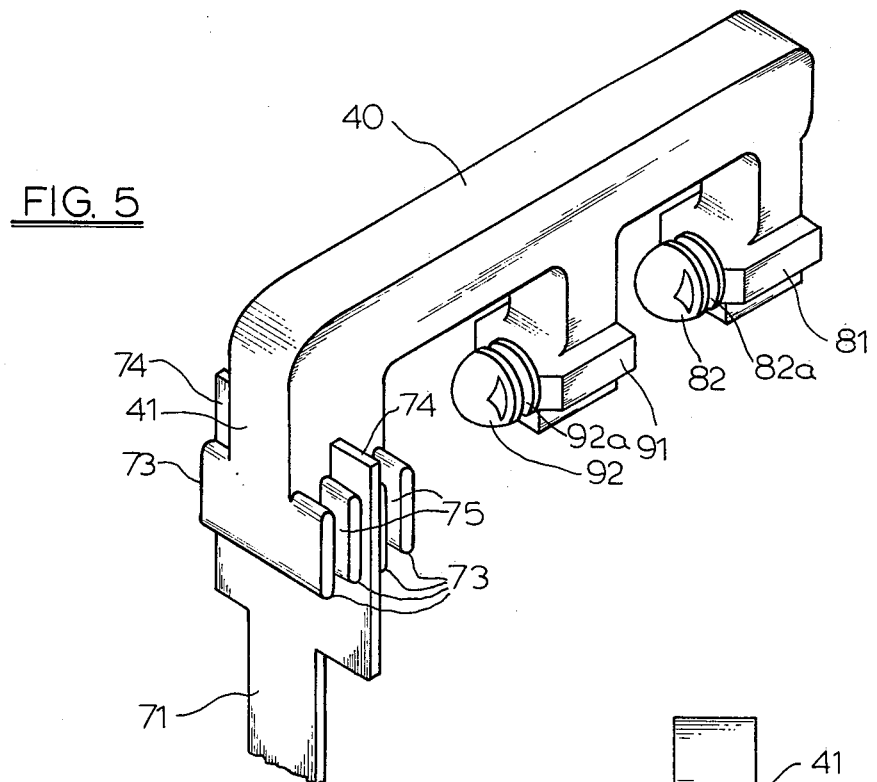
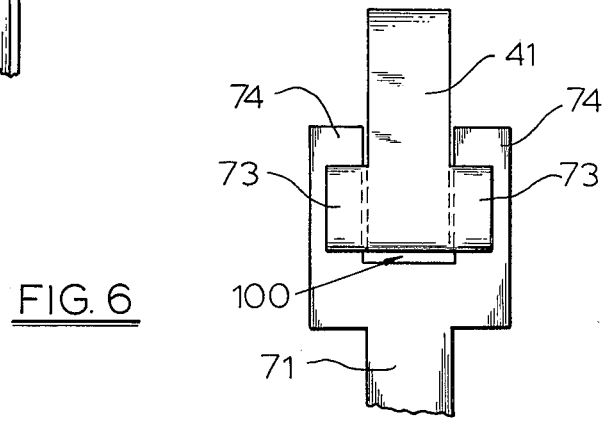

CENTRIFUGAL SWITCH ACTUATOR FOR A MOTOR

BACKGROUND OF THE INVENTION

1. Field of the Invention

This invention relates to switch actuators for centrifugal switches, and more particularly to an actuator lever assembly which eliminates the need for readjustment after assembly and can be used in automatic laundry appliances.

2. Description of the Prior Art

Switches which make and break electrical contacts in response to the rotational velocity of a motor are known in the art. Mechanisms mounted on the motor shaft having elements which are moved away from the shaft due to the centrifugal force generated by rotation of the shaft are known as centrifugal mechanisms. Such mechanisms are utilized to operate circuit control switches, known as centrifugal switches, as shown in representative U.S. Pat. Nos. 4,095,073, 3,699,288, 2,991,655 and 2,747,854.

Such centrifugal switches have wide application, including use in domestic appliances such as an automatic clothes dryer. The manner of use and operation of a centrifugal switch in a dryer appliance control is described in U.S. Pat. No. 4,112,588.

Centrifugal switches have in common a centrifugal mechanism mounted on the motor shaft which is movable in response to the rotational velocity of the shaft, and switch contacts spaced from the shaft which are movable by an actuator linking the rotational velocity-responsive element to the contacts. A problem arising in the assembly of such switches within the machinery to be controlled thereby is that of consistently achieving proper dimensional location of the stationary switch actuator relative to the rotational velocity-responsive element of the centrifugal switch mechanism. Improper or imprecise location of one relative to the other results in such problems as incorrect switch cutout speeds, failure of the centrifugal mechanism to actuate the stationary switch, and rubbing of the actuator against the rotational velocity-responsive element during motor operation. Previous solutions to this problem all involve manual readjustment or reworking of some portion of the switch mechanism, such as relocating the velocity-responsive element on the motor shaft, bending the actuator, or repositioning the stationary switch or adjusting the stationary switch position.

The nature of the adjustment which must be made is a result of typical manufacturing variations in the tooling of the individual parts of the mechanism, which may result even if each part is manufactured within specified tolerances. The previous solutions to the problem all involve the addition of more personnel and/or assembly steps to the assembly process, thereby increasing the time and cost of assembly.

SUMMARY OF THE INVENTION

The present invention comprehends a linkage for operating a stationary switch in response to movement of a rotational movement of a motor shaft comprising a lever for a centrifugal mechanism which cooperates with an actuator in the stationary centrifugal switch to allow precise adjustment positioning of the lever relative to a velocity-responsive element of the mechanism and the stationary switch housing.

The centrifugal mechanism has an element mounted on a motor shaft for corotation with the shaft. The element has weighted arms pivotally mounted thereon normally maintained adjacent the shaft by spring bias, but which move outwardly of the shaft with increased rotational shaft velocity. The arms are connected to a slidable collar mounted on the shaft for axial movement with respect to the shaft so that the collar is moved axially according to the rotational velocity of the shaft.

A stationary centrifugal switch housing is mounted apart from the shaft and contains movable electrical contacts for selective opening and closing of associated circuitry. The housing contains a spring-biased actuator which is movable inside the housing to position the contacts, and has a portion extending out of the housing which has a plurality of grooves thereon.

A lever has a lower member adjacent the axially movable collar and an upper member which forms a notch having fingers received in the grooves of the actuator. The lever is pivotally mounted on a portion of the motor housing for rotation about a point approximately midway between the upper and lower members. Axial movement of the collar due to increased rotational velocity of the shaft moves the collar away from the lower member of the lever, allowing the lever to pivot under the bias of the actuator to move the actuator to connect or disconnect various electrical contacts in the stationary switch housing.

During assembly of the entire mechanism, the axially slidable collar is mounted within tolerances on the shaft in a rest position, thereby insuring the desired relative dimensioning of the lever with respect to the collar. Positioning of the lower member of the lever in such a manner will simultaneously position the upper member of the lever in a proper position relative to the collar, because the lever is of one-piece construction. The stationary switch housing can then be mounted on another portion of the motor housing by aligning the notch in the upper member of the lever with one of a plurality of grooves carried on the actuator which is a part of the stationary switch. By providing a plurality of positions on the actuator which receives the upper member of the lever, the position best accommodating the previously adjusted lever position can be chosen, thereby eliminating the need for later adjustment or reworking of any part of the mechanism, and providing a selectively positionable linkage.

The actuator is lightly biased so that when the collar moves to a run position, the actuator will move to its run position.

A centrifugal switch with the actuator as described above is particularly suitable for use in automatic laundry appliances, such as automatic clothes dryers, in which a motor start winding is electrically deenergized after the motor achieves a preselected rotational velocity, and in which a heating element is energized upon attainment of a preselected rotational velocity of the motor shaft, which in turn determines the rotational velocity of a clothes-tumbling drum.

BRIEF DESCRIPTION OF THE DRAWINGS

FIG. 1 is a perspective view, partly broken away, of an automatic clothes dryer embodying a centrifugal mechanism and centrifugal switch actuator constructed in accordance with the principles of the present invention.

FIG. 2 is a partial sectional view of the centrifugal switch and mechanism and actuator of the present invention.

FIG. 3 is a sectional view taken on line III—III of FIG. 2 with the actuator shown in the run position.

FIG. 4 is a side view of the switch actuator operating in cooperation with the lever.

FIG. 5 is a perspective view of the actuator of FIG. 4.

FIG. 6 is an end view of the lever and actuator of FIG. 4.

DESCRIPTION OF THE PREFERRED EMBODIMENTS

An automatic clothes drying appliance is shown generally at 10 in FIG. 1. The dryer 10 has a cabinet 11 having a hinged door 12 opening on a front thereof. The dryer 10 has a control panel 13 having a control dial 15 which is user-operable to selectively set a control device 14 for various drying cycles of operation, as for example, a timed drying cycle.

A flange 20 in the front of the cabinet 11 defines a receptacle opening 21 through which clothes may be deposited in a rotatable drum 22. The drum 22 has radially inwardly extending vanes 25 mounted on an interior surface thereof, and is rotated by a suitable drive means 23, including an electric motor 16 for driving a blower 23a attached thereto.

A rear wall 29 of the dryer 10, against which the drum 22 rides in air-sealed relation, has an air inlet 26 and an air outlet 28 therein. A perforated wall 26a extends vertically within the inlet 26 and is mounted to an inlet air duct 27a. Within the inlet duct 27a is a heating element shown generally at 27. The perforations in the wall 26a allow heated air flowing from the heating element 27 to enter the drum 22 through the perforations. The outlet 28 is formed by perforations in the rear wall 29. Air is circulated by the blower 23a through the duct 27a, heated by the heating element 27, and is then further circulated through the inlet 26, through the drum 22 to the outlet 28. It will be understood that the heating element 27 in duct 27a may be an electrical element or a gas burner. Where the heating element comprises a gas burner, the burner may be located below the drum 22 and the duct 27a extended to form an air communication channel between the burner and the inlet 26.

The dryer 10 may also be provided with a removable lint trap 24. It will be understood that positioning of the various elements in the dryer 10 as shown in FIG. 1 is for illustrative purposes only, and the elements need not occupy the position shown.

As shown in detail in FIG. 2, the electric motor 16 has a stator core 30 attached to a motor housing 42 and a rotor core 31 corotational with a drive shaft 32. A centrifugal mechanism responsive to the rotational velocity of the shaft 32 is shown generally at 33 for actuation of switches contained in a stationary centrifugal switch housing 34. The motor is contained in housing 42 and terminates in an end cap 43 to which the stationary switch housing 34 is attached in a recessed portion 35 by a bolt 36.

The housing 34 has pairs of terminals 38a and 38b, and 39a and 39b respectively connected in a conventional electrical circuit for heater 27, the start winding (not shown) associated with the motor 16 and an end of cycle buzzer (not shown). Motors having windings of this type are well known in the art, in which the start and run windings are energized together during an initial period upon energization of the motor when the starting torque is high, and a switch disconnects the start winding when the motor attains a preselected speed.

In order to disconnect the start winding after the motor attains a certain rotational velocity, the velocity-responsive centrifugal mechanism 33 is utilized. Although any type of centrifugal mechanism known in the art may be employed without departing from the inventive concept herein, a representative centrifugal mechanism is illustrated in FIG. 2. The mechanism consists of a collar 45 press fitted on the shaft 32 over a knurled portion 46 for corotation therewith. The collar 45 has two arms 47, each extending outwardly to an angular arm 47a. Each arm 47 is provided with a tab 47b extending outwardly to form a stop. The angular arms 47a are each punched out in a manner to provide a transverse elongated slot 47c to provide a bearing surface for a pair of weights 51. The weights 51 are angular in shape to provide a bifurcated arm 52 having fingers 53. The fingers 53 extend loosely into recesses 53a on a slidable collar 54. Springs 55 bias the weights 51 against the stops 47b. The collar 54 is slidably on shaft 32 so that as shaft 32 gains rotational velocity, the weights 51 will move outwardly against the bias of the springs 55, pivoting the arms 52 to slide the collar 54 away from end cap 43, thus moving the collar 54 from an initial rest position to a final running position 54a. The position 54a can be preselected by cooperative selection of the length of the arms 47a and the size of stops 47b. A more detailed description of the illustrated type of centrifugal mechanism may be found in U.S. Pat. No. 2,747,854, issued to W. K. Schnepf, and that disclosure is incorporated herein by reference.

The shaft 32 is held in place in the end cap 43 by any suitable bearing means, such as bearing races 60 and 61 containing ball bearings 62.

A lever 70 is pivotally attached to the end cap 43 at 76, and has a lower portion 72 which is movable by the collar 54 and an upper portion 71 which terminates in upwardly extending fingers or tynes 74 to form a U-shaped notch or fork 100, as shown in FIG. 6. As shown in FIG. 4, the tynes 74 engage an actuator 40 of the stationary centrifugal switch 34 in one of a plurality of switch grooves 75 defined by a plurality of ribs 73 formed on the actuator. Movement of the collar 54 to the running position 54a from initial position 54 allows pivoting of the lever 70 counterclockwise about pivot point 76 to the position shown at 70a, thereby allowing the actuator 40 to move to the running position shown by broken lines at 40a. In the running position, lower portion 72 of lever 70 does not contact collar 54, thereby reducing frictional wear on lever 70. This condition can be achieved consistently by proper location of pivot point 76 and by controlling the travel of centrifugal switch actuator 40.

The interior of the stationary switch 34 is shown in section in FIG. 3, and the actuator 40 is shown in greater detail in FIGS. 4, 5 and 6. As shown in FIG. 3, the stationary switch 34 is surrounded by a wall 80 and the actuator 40 extends into the interior of the housing 34 through an opening 80a. The actuator 40 is biased toward the running position 40a of FIG. 2 by a spring 99. Further movement of actuator 40 beyond the running position 40a is prevented by contact of a head 92 on actuator 40 with wall 80. The actuator 40 has a downwardly extending portion 41 on which the ribs 73 are molded, and has additional downwardly extending members 81 and 91 disposed on the portion of the actuator 40 in the interior of the housing 34. The downwardly extending member 81 terminates in a head 82 forming a groove 82a which receives the ends of a pair of leaf springs 83a and 83b. The opposite end of the leaf spring 83b terminates in a leaf-spring switch 84. Similarly, the downwardly extending member 91 has head 92 defining a groove 92a for receiving the ends of a pair of leaf springs 93a and 93b. The other end of the leaf spring 93b terminates in a leaf-spring switch 94. Movement of the actuator 40 causes corresponding movement of the members 91 and 81. When the member 81 is moved against the bias of the spring 99 in the direction of arrow 99a, the leaf springs 83a and 83b force the leaf-spring switch 84 to snap over to break the electrical connection between contacts 85 and 86. Similarly, movement of the member 91 in the direction of arrow 99a against the bias of the spring 99 causes the leaf springs 93a and 93b to snap over the leaf-spring switch 94 to break the contacts 95 and 96 and make the contacts 95 and 98. The contacts shown in FIG. 3 may be associated with any circuitry, such as the start and run windings of the motor, a heating element circuit, or a buzzer circuit for alerting a user to a particular point in the cycle. As shown in FIG. 3 in the running position shown in broken lines 40a, contacts 85 and 86 connect heater 27 in circuit after the motor has attained a preselected rotational velocity. Contact 95 alternately electrically connects first the start winding in the rest position 40 through contact 98 and then in the running position 40a connects a buzzer circuit (not shown) through contact 96.

During assembly of the entire unit shown in FIG. 2, the collar 54 is in the solid line rest position on the shaft 32 and the stationary switch 34 can be mounted on the end cap 43 within manufacturing tolerances. In accordance with the invention, the assembly of the linkage for operating the stationary switch in response to the rotational movement of the motor shaft 32 is facilitated. The lever 70 engages the collar 54 at its lower portion 72, thereby simultaneously positioning the upper member 71 relative to the collar 54. Upper member 71 can then be engaged in the best fit of the grooves 75 on the actuator 40 by depressing actuator 40 in against the bias of spring 99 to the rest position and positioning the selected groove in the fork 100 as the switch housing 34 is positioned in recess 35. Since manufacturing tolerances cause the axial position of upper member 71 to vary from motor to motor with respect to the stationary switch mounting, assembly in this manner provides a number of available mating grooves for the upper member 71, so that the lever 70 can be permanently positioned properly relative the stationary switch 34 and the velocity responsive mechanism 33 without further adjustment. Previous structure and methods of assembly required either repositioning of the stationary switch 34, or reworking of the velocity responsive mechanism 33 in order to achieve proper relative positioning of each so that the actuator 40 would be properly moved to completely make and/or break the desired electrical connections.

It will be understood that although the operation of the device disclosed herein is in the context of a laundry dryer, the inventive concept disclosed herein has application in any mechanism utilizing a centrifugal switch mechansim, and can be used in any domestic appliance or other machinery.

Although modifications and changes may be suggested by those skilled in the art it is the intention of the inventor to embody within the patent warranted hereon all changes and modifications as reasonably and properly come within the scope of his contribution to the art.

The embodiments of the invention in which an exclusive property or privilege is claimed are defined as follows:

1. A linkage for operating a stationary switch in response to the rotational velocity of a motor shaft, said shaft having a centrifugal mechanism mounted thereon and movable in response to a change in the rotational velocity of said motor shaft, and linkage comprising:
   a lever mounted adjacent to and adapted to be moved by said centrifugal mechanism, said lever having a notched end, and
   an actuator for said stationary switch having a plurality of adjacent grooves thereon, said notched end of said lever positioned to mate with one of said grooves,
whereby the relative position of said lever with respect to said centrifugal mechanism and said actuator can be fixed by selective positioning of said notch in one of said grooves.

2. The linkage of claim 1 wherein said stationary switch is contained in a motor housing and said lever is pivotally mounted on said housing to transmit movement of said centrifugal mechanism to said actuator.

3. The linkage of claim 2 wherein said lever comprises:
   a vertical upper member terminating in said notched end;
   a vertical lower member engageable with aid centrifugal mechanism in response to a change in the rotational velocity of said shaft; and
   a central horizontal member connecting said upper and lower members and pivotally mounted on said housing to allow limited rotational movement of said lever.

4. The linkage of claim 1 wherein said notched end of said lever is formed by two spaced upwardly extending tynes connected to an upper portion of said lever.

5. The linkage of claim 1 wherein said grooves on said actuator are formed by spaced vertical ribs carried on said actuator.

6. In a motor having a start winding, a run winding, a stationary switch connecting said start winding to a source of electrical potential, and a centrifugally operated mechanism for operating said switch to disconnect said start winding from said source at a given speed of rotation of said motor, an improvement in a switch actuation means interconnecting said switch and said centrifugally operated mechanism, said improvement comprising:
   a switch actuator for operating said stationary switch, said actuator provided with a plurality of axially spaced grooves; and
   a lever moved by said centrifugally operated mechanism, said lever having a forked end interconnected to one of said grooves,
whereby manufacturing tolerances in said mechanism to switch interconnection are compensated for by positioning of the forked lever in said groove.

7. The improvement of claim 6 wherein said centrifugally operated mechanism is contained in a motor housing and said lever is pivotally mounted on said housing to transmit movement of said centrifugally operated mechanism to said actuator.

8. The improvement of claim 7 wherein said lever is comprises of:
 a vertical upper member terminating in said forked end;
 a vertical lower member engageable with said centrifugally operated mechanism; and
 a central horizontal member connecting said upper and lower members and pivotally mounted on said housing to allow limited rotational movement of said lever.

9. The improvement of claim 6 wherein said actuator is biased to return to and maintain the relative position of said actuator, said lever, and said centrifugally operated mechanism after displacement by said centrifugally operated mechanism.

10. The improvement of claim 6 wherein said grooves on said actuator are formed by spaced vertical ribs carried on said actuator.

11. In a dryer having a motor, a stationary switch operable to connect said motor to a source of electrical potential, and a centrifugally operated mechanism for operating said switch in response to the speed of rotation of said motor, an improvement in a linkage for actuating said switch for transmitting movement from said centrifugally operated mechanism to said switch, said improvement comprising:
 an actuator for operating said stationary switch, said actuator having a horizontal portion substantially contained in a stationary switch housing and interconnected with a plurality of electric contacts, said actuator movable to make and break said contacts, and said actuator further having a vertical portion disposed outside said stationary switch housing, said vertical portion provided with a plurality of axially spaced grooves; and
 a lever moved by said centrifugally operated mechanism, said lever having a forked end mating with one of said grooves,
whereby the relative position of said lever with respect to said stationary switch housing and said centrifugally operated mechanism can be fixed by selective positioning of said forked end in one of said grooves.

12. An actuator for opening and closing a plurality of electrical contacts in a switch, said actuator movable in cooperation with a lever for transmitting motion to move said actuator and said contacts at a time triggered by movement of said lever, said lever having a pre-positioned notched end selectively received in one of a plurality of axially spaced grooves on said actuator during interconnection of said actuator and said lever to fix the relative position of said lever and said actuator without further adjustment.

* * * * *